United States Patent
Laine et al.

(10) Patent No.: US 10,656,952 B2
(45) Date of Patent: May 19, 2020

(54) SYSTEM ON CHIP (SOC) AND METHOD FOR HANDLING INTERRUPTS WHILE EXECUTING MULTIPLE STORE INSTRUCTIONS

(71) Applicant: NXP B.V., Eindhoven (NL)

(72) Inventors: Nicolas Laine, Caen (FR); Cyril Edeline, Caen (FR)

(73) Assignee: NXP B.V., San Jose, CA (US)

( * ) Notice: Subject to any disclaimer, the term of this patent is extended or adjusted under 35 U.S.C. 154(b) by 423 days.

(21) Appl. No.: 14/702,612

(22) Filed: May 1, 2015

(65) Prior Publication Data

US 2015/0317164 A1    Nov. 5, 2015

(30) Foreign Application Priority Data

May 2, 2014  (EP) .................................... 14290133

(51) Int. Cl.
  *G06F 9/30*     (2018.01)
  *G06F 9/38*     (2018.01)
  (Continued)

(52) U.S. Cl.
  CPC ........ *G06F 9/3861* (2013.01); *G06F 9/30043* (2013.01); *G06F 13/24* (2013.01); *G06F 13/124* (2013.01)

(58) Field of Classification Search
  CPC .... G06F 9/3861; G06F 9/30043; G06F 9/384; G06F 9/30112; G06F 9/30036; G06F 13/124
  (Continued)

(56) References Cited

U.S. PATENT DOCUMENTS 5,440,703 A * 8/1995 Ray .................... G06F 9/3863
                                                              712/228
5,887,152 A * 3/1999 Tran .................... G06F 9/3812
                                                              711/136
(Continued)

FOREIGN PATENT DOCUMENTS

CN         1567277 A      1/2005
CN         1845087 A      10/2006
EP         1154575 A1 *   11/2001   .............. H03M 7/40

OTHER PUBLICATIONS

Atmel, "AT91SAM ARM-Based Flash MCU SAM3U Data Sheet", Feb. 21, 2012, ATMEL, (pp. 62, 111-112, 165, 175-176, and 187).*
(Continued)

*Primary Examiner* — Aimee Li
*Assistant Examiner* — Courtney P Carmichael-Moody (57) ABSTRACT

A processor circuit is disclosed. In an embodiment, the processor circuit includes a processor unit configured to execute a multiple load or multiple store instruction for loading or storing a plurality of data words, and a data interface block, DIB, configured to communicate with the processor and configured to, in response to an occurrence of an interrupt during execution of the multiple load or store instruction, save the state of the multiple load or store instruction. Saving the state can comprise storing the number of data words already loaded or stored when the interrupt occurred. When the multiple load/store instruction is executed again after the interrupt, the DIB can skip the stored number of data words.

20 Claims, 5 Drawing Sheets

(51) Int. Cl.
*G06F 13/24* (2006.01)
*G06F 13/12* (2006.01)

(58) Field of Classification Search
USPC .......................................................... 710/260
See application file for complete search history.

(56) References Cited

U.S. PATENT DOCUMENTS

| | | | | |
|---|---|---|---|---|
| 6,055,616 | A * | 4/2000 | Panwar | G06F 5/065 |
| | | | | 710/52 |
| 6,105,127 | A * | 8/2000 | Kimura | G06F 9/3009 |
| | | | | 712/205 |
| 6,260,086 | B1 | 7/2001 | Butler et al. | |
| 6,308,253 | B1 * | 10/2001 | Gadre | G06F 9/3001 |
| | | | | 707/999.101 |
| 6,711,692 | B1 * | 3/2004 | Maeda | G06F 1/26 |
| | | | | 713/310 |
| 6,981,083 | B2 * | 12/2005 | Arimilli | G06F 9/462 |
| | | | | 710/260 |
| 7,490,221 | B2 | 2/2009 | Evans et al. | |
| 2002/0078286 | A1 * | 6/2002 | Miyake | G06F 9/30043 |
| | | | | 710/260 |
| 2002/0166004 | A1 * | 11/2002 | Kim | G06F 13/28 |
| | | | | 710/22 |
| 2004/0054833 | A1 * | 3/2004 | Seal | G06F 9/30043 |
| | | | | 710/260 |
| 2008/0126744 | A1 * | 5/2008 | Moyer | G06F 9/3861 |
| | | | | 712/4 |
| 2009/0157945 | A1 * | 6/2009 | Arimilli | G06F 9/30116 |
| | | | | 711/100 |
| 2014/0195775 | A1 * | 7/2014 | Ould-Ahmed-Vall | |
| | | | | G06F 9/30036 |
| | | | | 712/5 |
| 2016/0210465 | A1 * | 7/2016 | Craske | G06F 9/3861 |

OTHER PUBLICATIONS

"Cortex—M0 Revision: r0p0 Technical References Manual", ARM, 68 pgs., retrieved from the internet at: http://infocenter.arm.com/help/topic/com.arm.doc.ddi0432c/DDI0432C_cortex_m0_r0p0_trm.pdf (2009).

* cited by examiner

SYSTEM ON CHIP (SOC) AND METHOD FOR HANDLING INTERRUPTS WHILE EXECUTING MULTIPLE STORE INSTRUCTIONS

CROSS-REFERENCE TO RELATED APPLICATIONS

This application claims the priority under 35 U.S.C. § 119 of European patent application no. 14290133.9, filed on May 2, 2014, the contents of which are incorporated by reference herein.

FIELD OF THE INVENTION

The invention relates to controller circuits, data interface blocks, and methods for transferring data. In particular, the invention relates to controller circuits, data interface blocks and methods for a processor which has an instruction set including a multiple load/store instruction.

BACKGROUND OF THE INVENTION

The instruction set of modern processor units can include a multiple load/store instruction. With a multiple load/store instruction, a single instruction can be used to load or store, for example by reading from or writing to a peripheral block, a plurality of data words.

A processor with a multiple load/store instruction is disclosed in U.S. Pat. No. 6,260,086. For writing a plurality of data words to a serial peripheral interface, a set of peripheral data words is used as well as a first in/first out (FIFO) buffer.

Another example of a processor with a multiple load/store instruction is the ARM Cortex-M0 by ARM Limited.

A feature of known processors with multiple load/store instructions is that the instruction execution is not atomic and may thus be interrupted. When the interrupt processing is finished, the instruction is typically repeated in its entirety. This may have serious consequences. For example, when a multiple store instruction is used to write to a peripheral data interface, a repeat of the entire instruction after an interruption means that the data words which were already written before the interrupt occurred are written twice. This results in incorrect data being written to the peripheral data interface. Likewise, an interruption during a non-atomic multiple load execution can also result in inaccurate data being written.

One way of preventing these effects is to mask interrupts so that they do not interrupt the execution of the multiple load/store instruction. Another way is to simply not use the multiple load/store instruction at all, or at least not when reading from or writing to a peripheral interface. The former way is often not feasible, as the interrupts must be timely handled. The latter way is undesirable, as it leads to more instructions, which increases the overhead of instruction storage, fetching, and decoding.

Therefore, there is a need for a processor circuit and method to use multiple load/store instructions (hereafter also: multiple transfer instruction) which are robust against interruption during execution.

Furthermore, as it is nowadays customary for hardware makers to design-in, for example in a system-on-chip, processor units from third party processor vendors, there is a need for a solution which does not require modifications to the processor unit itself but which can be implemented using circuitry external to the designed-in processor unit.

SUMMARY OF THE INVENTION

According to a first aspect, the invention provides a processor circuit, comprising:
   a processor unit configured to execute a multiple load or multiple store instruction for loading or storing a plurality of data words;
   a data interface block (DIB) configured to, in response to the occurrence of an interrupt during execution of the multiple load or store instruction, save the state of the multiple load or store instruction.

In an embodiment, the processor circuit further comprises an instruction bus, the IMB being connected to the instruction bus for monitoring instructions transmitted on the instruction bus.

In an embodiment, the DIB is configured to detect the start of execution of the multiple load or store instruction.

In an embodiment, saving the state of the multiple load or store instruction comprises storing a value indicating the number of data words already loaded or stored when the interrupt occurs.

In an embodiment, the DIB is configured to, when the multiple load or store instruction is executed again after an interrupt, skip a number of data words for loading or storing, wherein said number equals the stored value.

In an embodiment, the processor circuit comprises a data bus, and the DIB comprises a data register for storing a data word to be loaded or stored, wherein the data register is connected to the data bus In an embodiment, the DIB comprises a first in and first out, FIFO, buffer. In an embodiment, the FIFO is connected to a serial or parallel data interface. The FIFO may be connected to the data register of claim.

In an embodiment, the processor circuit is formed as a System-on-Chip (SoC).

According to a second aspect, there is provided a data interface block (DIB) for use in a processor circuit as described above.

According to a third aspect, there is provided a method for loading or storing a plurality of data words, the method comprising
   executing, in a processor unit, a multiple load or store instruction;
   writing at least one data word to a data interface block, DIB;
   detecting the occurrence of an interrupt of the processor unit;
   signaling to the DIB that the multiple load or store instruction is interrupted;
   storing, by the DIB, a state of the multiple load or store instruction;

In an embodiment of the third aspect, storing the state of the multiple load or store instruction comprises storing a value indicating the number of data words already loaded or stored when the interrupt occurs.

In an embodiment of the third aspect, the method further comprises, when the multiple load or store instruction is executed again after an interrupt, skipping a number of data words for loading or storing, wherein said number equals the stored value.

BRIEF DESCRIPTION OF THE FIGURES

Embodiments of the present invention will be described hereinafter, by way of example only, with reference to the accompanying drawings which are schematic in nature and therefore not necessarily drawn to scale. Furthermore, like reference signs in the drawings relate to like elements.

DETAILED DESCRIPTION

Figure 1:
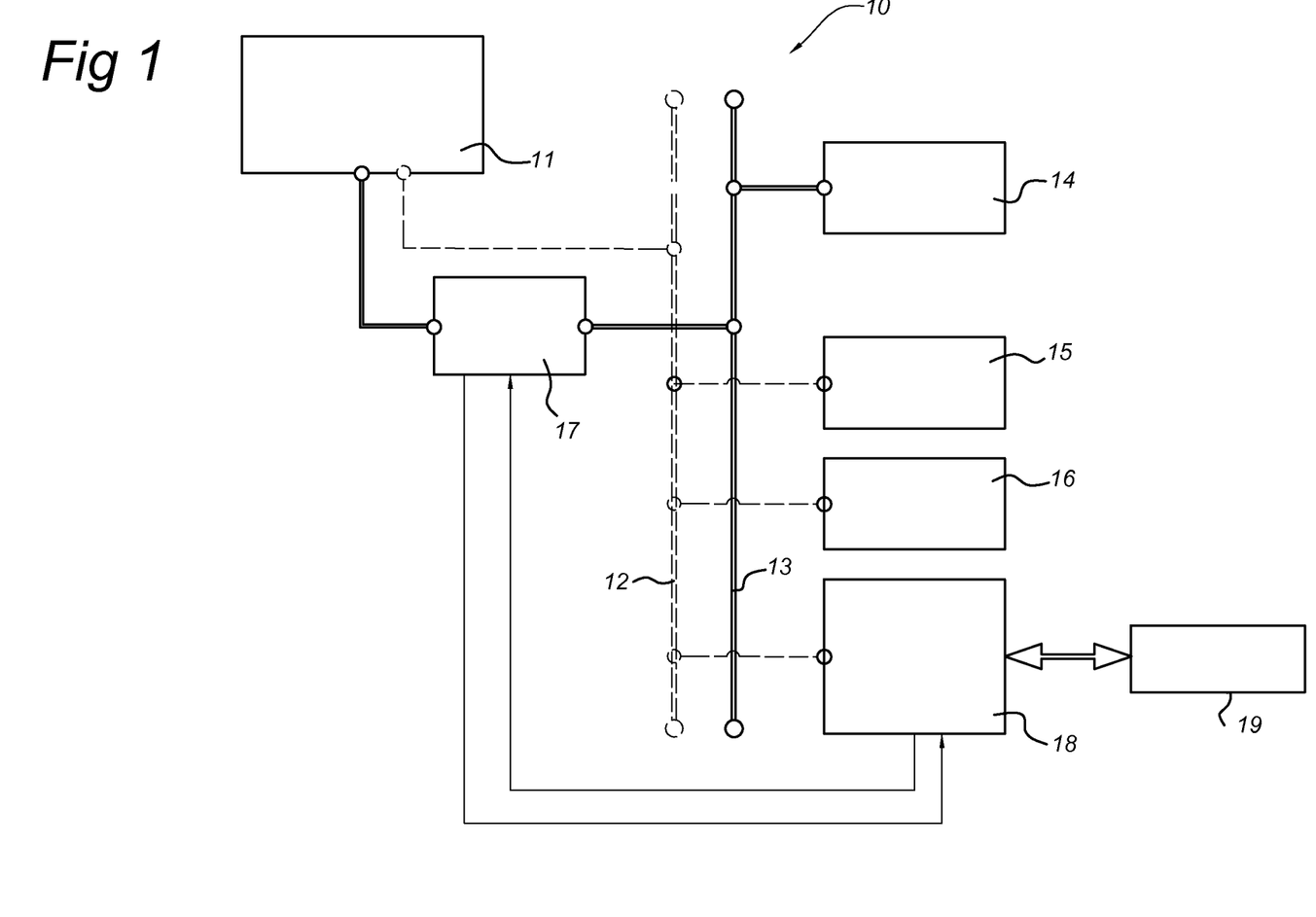
FIG. 1 schematically shows a processor circuit according to an embodiment.

FIG. 1 schematically shows a processor circuit 10 according to an embodiment of the invention. The circuit 10 may be implemented as a System-on-Chip. The circuit 10 comprises a processor unit 11 for executing data instructions, the processor unit having an instruction set which features a multiple load or store instruction (hereafter also: multiple transfer instruction (MTI) or multiple load/store instruction). An example processor unit is the ARM Cortex M0 32-bit processor.

Although it is possible to implement the invention by modifying the processor unit 11, it is also possible, as will be described in reference to the examples, to provide the additional functionality for handling interrupts during execution using additional blocks external to the processor unit 11. This allows the invention to be practiced with readily available third-party processor units 11 which cannot be (easily) modified.

The circuit further comprises a code memory 14 and a data memory 15 as well as a code bus 13 and a data bus 12, to transfer respectively code fetched by the processor 11 and data used by the processor. It is also possible to provide a single bus for both code and data traffic.

The data interface block (DIB) 18 is configured for sending/receiving data through a serial or parallel physical interface 19 of the system. The DIB 18 may be configured to detect the start of a multiple load/store instruction from/to the DIB, and to raise a flag MULTIPLE_TRANSFER_STARTED flag in response. The MULTIPLE_TRANSFER_STARTED flag is then raised for the duration of the multiple load/store instruction execution. The DIB 18 may also be described as a Data Interface Peripheral Block (DIPB). The DIPB or DIB 18 may be implemented as a dedicated hardware block.

An interrupt monitoring block (IMB) 17 is provided for detecting interrupts. In the example of FIG. 1, the IMB 17 is connected to the code bus 13. The IMB 17 is configured to detect interruption of a multiple load/store command and to inform the DIB 18 of the occurrence of an interrupt by raising the MULTIPLE_TRANSFER_INTERRUPTED flag. In an embodiment, the flag is only raised if, at the time the interrupt occurred, the DIB 18 has raised the MULTIPLE_TRANSFER_STARTED flag. The IMB 17 may be implemented as a dedicated hardware block. The IMB 17 may detect the occurrence of an interrupt by detecting that a (new) instruction is fetched by the processor unit 11 during execution of a multiple transfer instruction. In an alternative embodiment (not shown) the IMB 17 is configured to directly detect the occurrence of an interrupt, for example by being connected to an interrupt line.

It is possible to provide multiple instances of DIB blocks 18 in processor circuit 10 (e.g. in case of a system with multiple data interfaces 19). In this case a DIB 18 may receive a MULTIPLE_TRANSFER_INTERRUPTED flag from IMB 17 when the IMB 17 detects an interrupt while the respective DIB 18 has the MULTIPLE_TRANSFER_STARTED flag raised. If the DIB 18 is responsible for raising the MULTIPLE_TRANSFER_STARTED flag, and if one flag is defined per DIB 18 among the plurality of DIBs, the IMB 17 can be configured to raise the MULTIPE_TRANSFER_INTERRUPTED flag for only the DIB 18 which is currently engaged in the interrupted multiple transfer instruction. In an embodiment, each DIB 17 of the multiple DIBs has a separate "executing" flag line to the IMB 17, and the IMB 17 can raise a separate, dedicated, "interrupted" flag for each DIB 18 of the multiple DIBs. In embodiments, one, two, three, four, or more DIBs 18 may be provided in a processor circuit 10.

The optional clock and power management block 16 may be used to generate necessary clock(s) to the DIB 18, IMB 17, processor 11, and buses 12, 13. It can also handle power management of the processor circuit 10.

Figure 2:
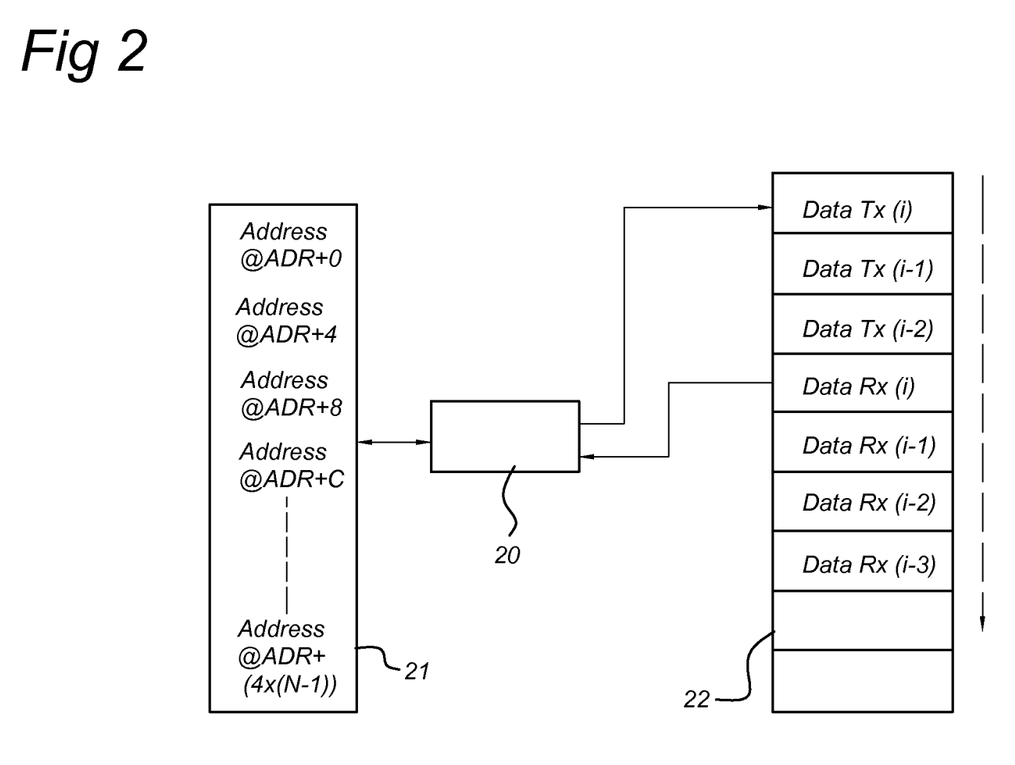
FIG. 2 schematically shows a circuit for a loading and storing data according to an embodiment.

FIG. 2 provides a closer look at parts of the DIB 18. In an embodiment, the DIB 18 comprises a data register 20, which can be reached by the processor 11 through the data bus 13. The data register 20 is used to transfer the data words between the DIB 18 and processor 11. The data register 20 is mapped onto N consecutive addresses 21 in data memory 15 for transferring N data words of width M.

The data register 20 can be used for both half and full duplex communications. Integer N is defined in another register or, can be fixed for a given hardware implementation (for instance: 4 words). Integer M is defined in another register or, can be fixed for a given hardware implementation, maximum value for M is defined by the width of the data bus (for instance: 8 bits).

In an embodiment, the DIB 18 also comprises a data first in/first out (FIFO) buffer 22. In an alternative embodiment, the FIFO 22 may be provided by the data interface 19. The data FIFO 22 is a data buffer with transmit and receive logic. The FIFO 22 depth is max(N)-word deep, a word is a max(M)-bit wide. The FIFO 22 may be split in two parts, one part for transmitting data words and one part for receiving data words.

Each data word successfully stored/read by the processor 11 during execution of a multiple transfer instruction, is respectively pushed in the data FIFO (store operation) or popped from the data FIFO (load operation). For example, with N=4; M=8, the DIB 18 is configured to transfer 4 consecutive data bytes with processor multiple load/store instructions.

In transmission (from the interface point of view, that is, when the processor 11 executes a store function), data is written to the FIFO 22 through the data register 20 once DIB 18 is enabled for transmission. When a write signal is asserted, data can be written into the FIFO 22 location specified by the current value of a data write pointer. The data write pointer is a circular pointer which is incremented after every FIFO write and iterates through all available FIFO 22 locations for transmission. Data can then be popped by data interface 19, incrementing a data read pointer, to be sent out. The difference between the data write pointer and the data read pointer (allowing for the circular nature of both pointers) represents the number of data words in the FIFO waiting for transmission, and may be stored in a FIFO register. A timeslot based mechanism ensures priority to the data register operation, between processor unit 11 and data interface 19, in case of simultaneous access.

In reception (from interface point of view, that is when the processor executes a load function), data is written by the data interface 19 when a correct data has been received (incrementing the number of data words in the FIFO). Data is read from the FIFO 22 through the data register once DIB 18 is enabled for reception. When the read signal is asserted, data can be read from the FIFO 22 location specified by the current value of the data read pointer for reception. The register storing the number of data words in the FIFO for reception is decremented after every FIFO 22 read. Again, a timeslot based mechanism ensures priority to the data register operation in case of simultaneous access.

Using a pair of circular read/write pointers with a FIFO data buffer split in two parts (the ratio between reception and transmission part can be configurable), it is possible to support full duplex communication with double access. In this case, two pairs of read/write pointers are necessary. In addition, a register may store the number of items for transmission (the circular-compensated difference between the write and read pointers for transmission) and another register may store the number of items for reception (the circular-compensated difference between the write and read pointers for reception).

The combination of IMB 17 and DIB 18 implement a state machine. When the processor executes a multiple store operation for N data words, a hardware counter (counter_word) is incremented for each new data word transferred by the processor 11 (in other words, counter_word runs from 0 to N−1). When the data register 20 is hit for the first time (counter_word=0), a flag is raised and signalled to the IMB 17 (MULTIPLE_TRANSFER_STARTED). This flag goes down when the last data word has been sent to the DIB 18 by the processor 11. The multiple load operation is implemented similarly.

If an interrupt occurs at the processor 11, the IMB 17 will detect it. In an embodiment, this detection is implemented by checking a new fetch request from the processor 11 to the code memory 14. Processor 11 will then automatically signal a raised flag MULTIPLE_TRANSFER_INTERRUPTED to DIB 18; whereupon DIB 18 will save the current value of counter_word in a dedicated (counter_word_stopped) variable. This way, DIB 18 saves the state of the interrupted multiple transfer instruction.

As soon as the processor 11 exits the interrupt, it will restart the multiple load (or store) command, and re-send the first data word to DIB 18. DIB 18 notices from the non-zero counter_word_stopped variable that the previous multiple transfer instruction was not successfully completed. As a result, DIB 18 will then skip the first counter_word_stopped data words, since these have been already sent from/to the data FIFO 22. By skipping the data words that have already been handled, the integrity of the data in the FIFO 22 is maintained.

When the multiple transfer instruction is completed (all N data words stored or loaded), the counter_word_stopped variable is reset to 0.

Figure 3:
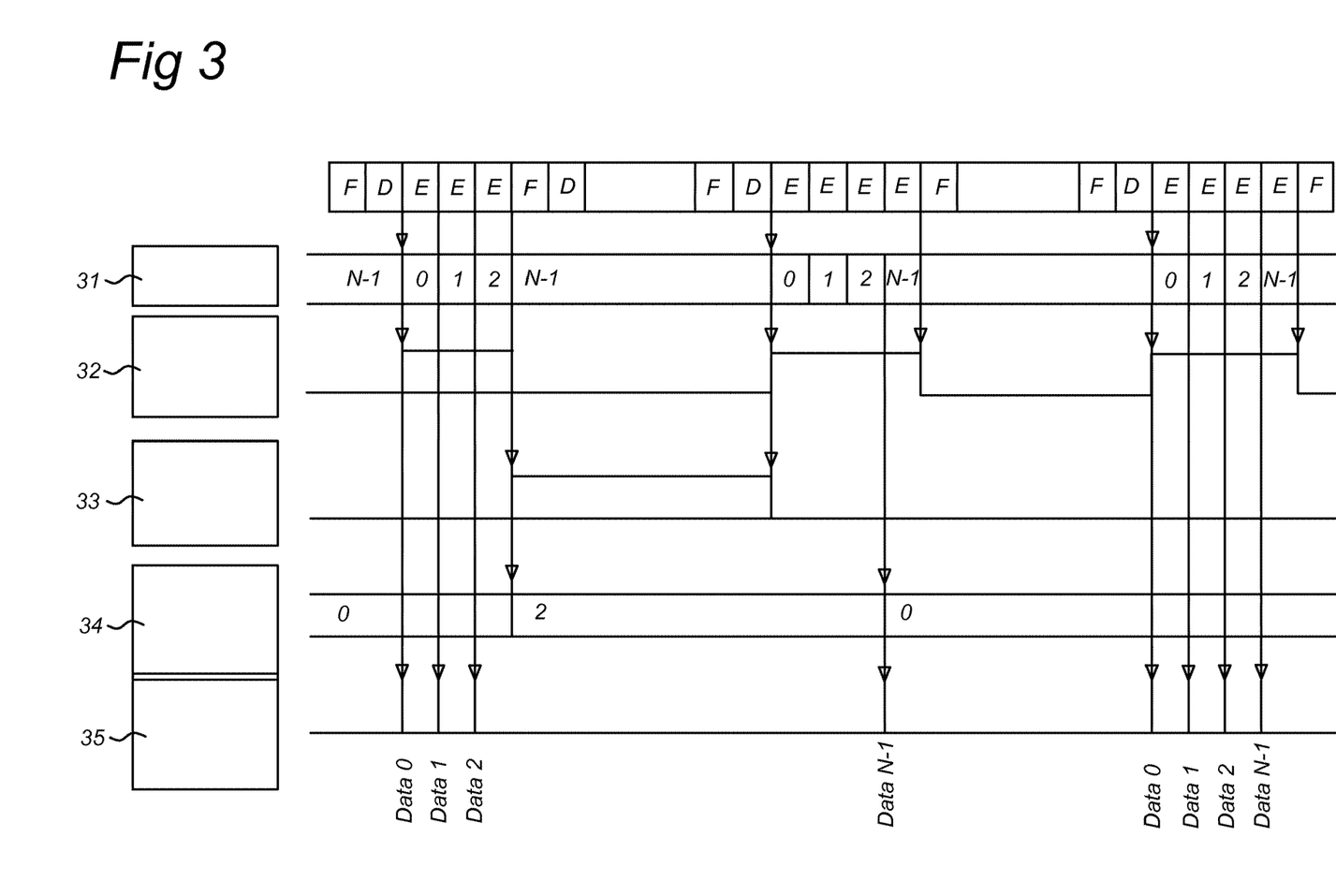
FIG. 3 schematically illustrates a multiple store operation according to an embodiment.
Figure 4:
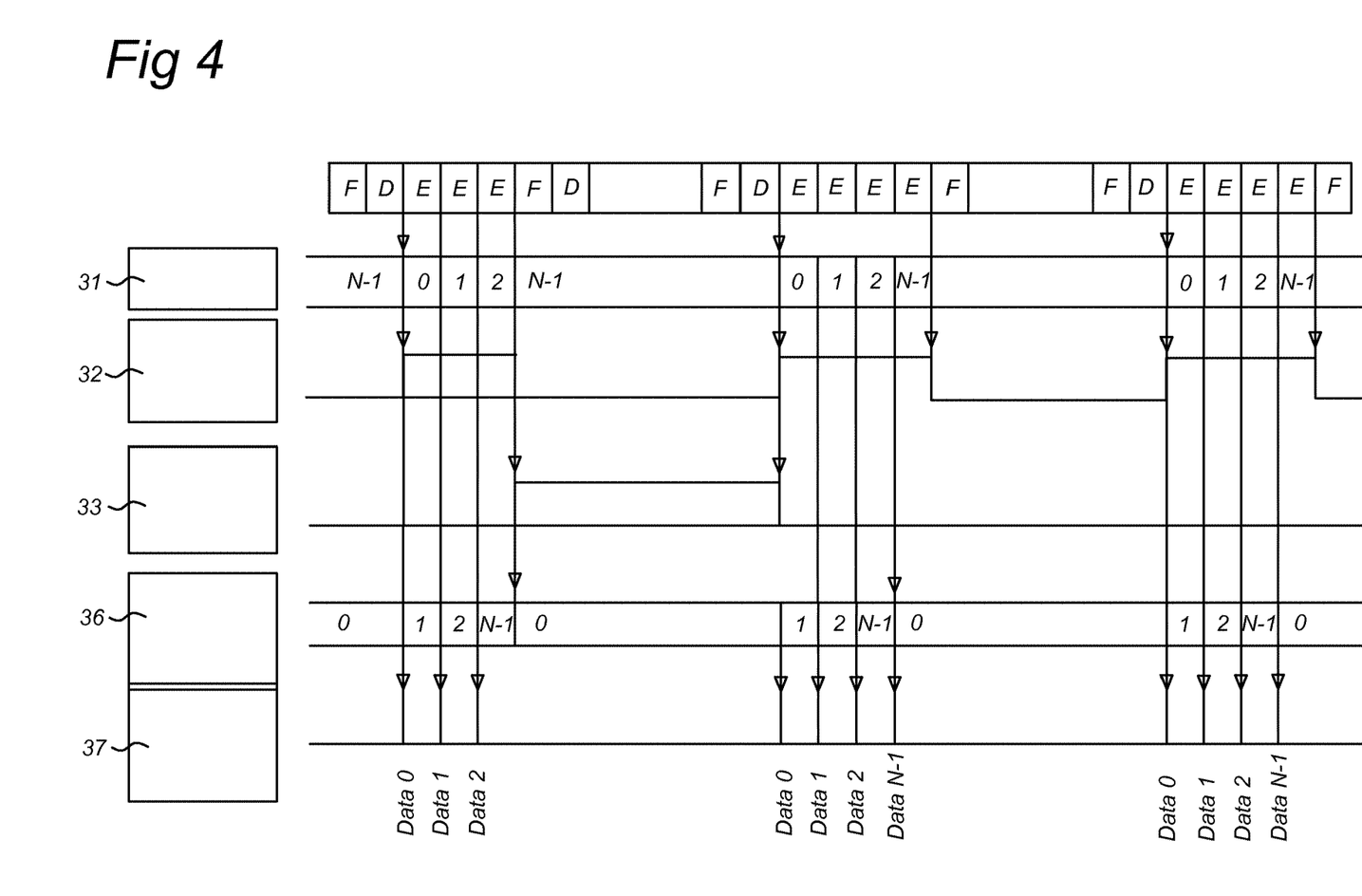
FIG. 4 schematically illustrates a multiple load operation according to an embodiment.

FIG. 3 schematically illustrates a multiple store operation according to an embodiment of the invention, while FIG. 4 schematically illustrates a multiple load operation according to an embodiment of the invention. In both figures, the states of the processor unit 11 (CPU state) is shown as either fetching (F), decoding (D), or executing (E) an instruction. The value of counter_word is represented by counter 31, the MULTIPLE_TRANSFER_STARTED flag is represented by 32, the MULTIPLE_TRANSFER_INTERRUPT flag is represented by 33. In FIG. 3, the variable counter_word_stopped is represented by 34 and the last row 35 illustrates which data words are pushed to the FIFO 22.

In FIG. 4, the FIFO read pointer (for reception, in the case of a full-duplex FIFO 22) is illustrated by 36. For clarity, the FIFO read pointer is set to 0 to indicate the position of the first data word in the FIFO. The last row 37 illustrates which data words are popped from (FIG. 4) the FIFO 22.

When the multiple transfer instructions begins executing for the first time, the MULTIPLE_TRANSFER_STARTED flag 32 is raised. In both examples, an interrupt is received after the $3^{rd}$ data word is pushed into or popped from the FIFO 22. At this point the MULTIPLE_TRANSFER_INTERRUPTED flag 33 is raised and the MULTIPLE_TRANSFER_STARTED flag 32 is lowered. The counter_word 31 value 2 (being the index of the third data word) is stored in the counter_word_stopped variable 34.

When the multiple transfer instructions begins executing for the second time, after the interrupt processing is concluded, the MULTIPLE_TRANSFER_STARTED flag 32 is raised again. At this point the MULTIPLE_TRANSFER_INTERRUPTED flag 33 is lowered.

In the store operation of FIG. 3, the data words 0, 1, and 2 (the value of counter_word_stopped 34) are skipped (not pushed onto the FIFO 22) since they had already been written to the FIFO 22 during the first execution of the multiple store instruction. When the counter_word 31 is increased beyond 2, the data words 3, 4, up to N−1 are pushed on the FIFO 22. After data word N−1 is written, the value of counter_word_stopped is reset to 0.

In the load operation of FIG. 4, the sequence is slightly different since the processor unit 11 needs to receive all data before popping out the N data words from the data FIFO 22. The read pointer of the FIFO 22 needs then to be reset to 0 when an interrupt occurs during a multiple load instruction; which can be done by checking the counter_word 31 value. In this embodiment, when the interrupt occurs the state of the DIB 18 is saved by resetting the FIFO 22 read pointer to the starting position for the MTI. This can for example be implemented by subtracting (in a circular way) the value of counter_word from the FIFO read pointer. This may be done immediately when the interrupt arrives (as shown in FIG. 4), or just before the MTI instruction is resumed.

If another interrupt were to occur during the second execution of the multiple transfer instruction, the counter_word_stopped variable would be updated only if the value of counter_word at the time of the second execution is higher than the stored value of counter_word_stopped. In other words, if the same multiple transfer instruction is repeatedly interrupted, DIB 18 remembers in counter_word_stopped the maximum value of counter_word that was reached in any one of the series of interrupted instructions.

Figure 5:
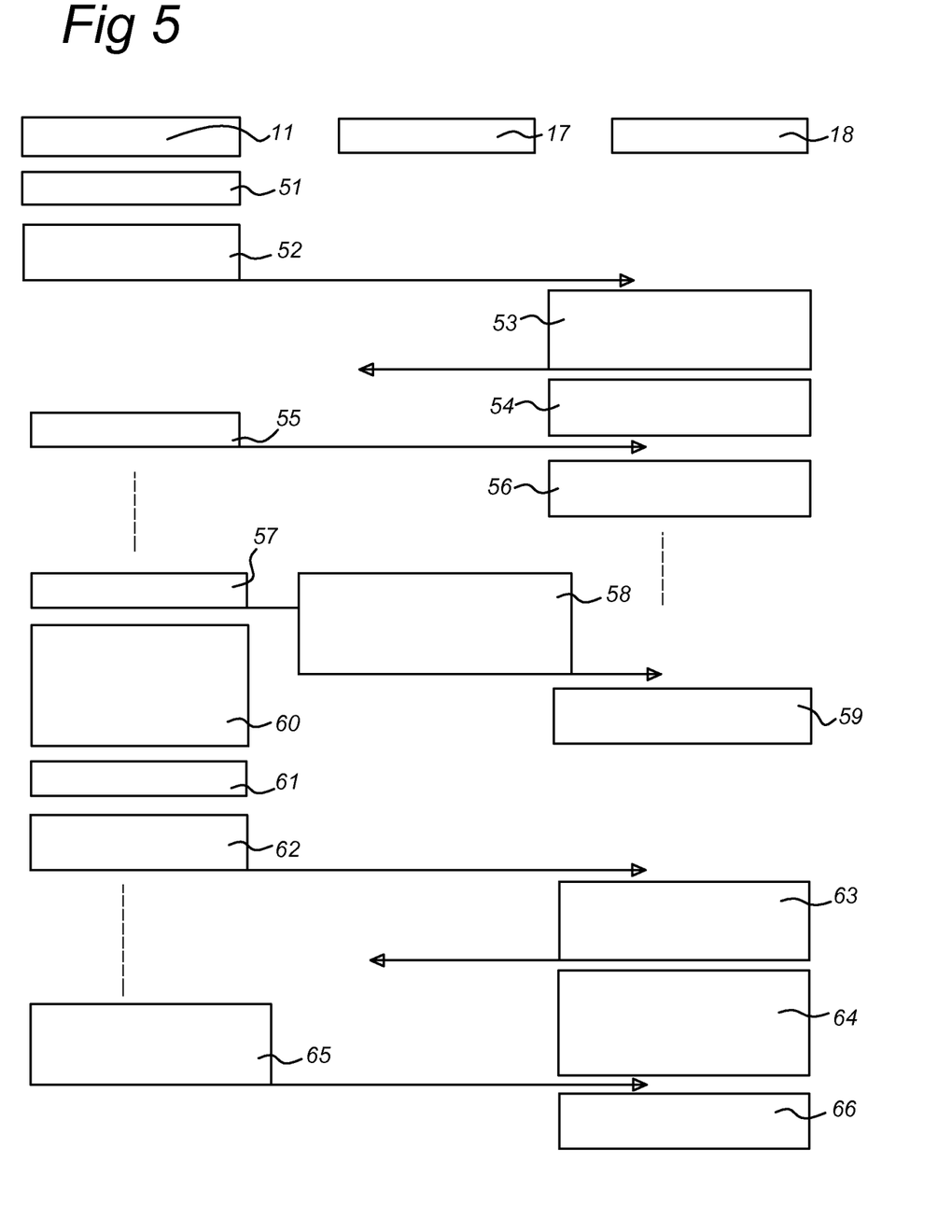
FIG. 5 schematically shows a method for storing data according to an embodiment.

FIG. 5 schematically shows a method for storing data according to an embodiment of the invention, corresponding to the schematic representation of FIG. 3. In step 51, the processor 11 fetches and decodes a multiple transfer instruction (MTI) and starts executing it in step 52 by writing a first data word to DIB 18 data register 20. DIB 18 detects the first word being written, raises the MULTIPLE_TRANSFER_STARTED flag for IMB 17 and sets counter_word to 0 in step 53. In step 54, the first data word is written to FIFO 22, and counter_word is incremented. The processor unit 11 now writes second data word in step 55, and in step 56, DIB 18 pushes this data word onto the FIFO 22 and increases the counter_word.

At some point before the MTI is completed, an interrupt is received 57, after which an interrupt handling begins 60. This occurrence is detected by the IMB 17 (for example by detecting that a new instruction is fetched by processor 11 before the completion of the multiple transfer), which raises the MULTIPLE_TRANSFER_INTERRUPTED flag for DIB 18 in step 58. As a result, in step 59, DIB 18 saves the current value of counter_word in counter_word_stopped.

After the interrupt processing is finished, the processor 11 again fetches and decodes the MTI in step 62. It then begins executing the instruction again by writing the first data word in action 62. This is again detected by DIB 18, which raises the MULTIPLE_TRANSFER_STARTED flag and resets counter_word to 0 in step 63. However, because the value of counter_word (0) is lower than the value of counter_word_stopped (2), the data word is not pushed onto the FIFO 22. In step 64, counter_word is increased one-by-one and all data words are skipped while the counter_word is smaller than or equal to counter_word_stopped.

Finally, in step 65, which is performed when counter_word>counter_word_stopped, the first new data word is written to the data register 20, which is then pushed onto the FIFO 22 by DIB 18 in step 66. When the instruction completes (after N data words have been pushed onto the FIFO 22), the value of counter_word_stopped is reset to 0.

In the above examples, a processor circuit, data interface block, and method are described for data transfer using a multiple transfer instruction in a way that is robust against interruptions of the processor during execution of the multiple transfer instruction. The data interface block is configured to save the state of the multiple transfer instruction at the time of interruption, which allows the data interface block to, when the multiple transfer instruction is executed again, continue writing or reading data from the point where it stopped during the previous, interrupted, execution, thus preventing data corruption due to twice written or read data.

An exemplary way in which the interruption can be detected is by providing an interrupt monitoring block. The IMB may monitor the processor unit's instructions (e.g. by monitoring the code bus). The IMB can for example raise an "interruption" flag if a new instruction is fetched during the execution of a multiple transfer instruction. The IMB may be aware that the multiple transfer instruction is being executed based on its analysis of the instructions or based on a "executing" flag received from the data interface block.

An exemplary way in which the execution of a multiple transfer instruction can be detected is by having the data interface block detect a first access to a data register in the block. This first access can be checked by examining the value of a counter_word variable which tracks the N number of data words being written or read during a multiple transfer instruction.

When the instruction is executed for a second time, after the interrupt, (or a third time, fourth time, etc, in case of a series of interrupts) the instruction data words that have already been written or read are skipped. In case the DIB has a FIFO, care is taken that the FIFO read/write pointers are kept consistent. In the case of a multiple store instruction, skipping the correct number of data words can for example be implemented by referring to a variable counter_word_stopped which stores the maximum number of data words that have been written/read in a previous execution of the multiple transfer instruction. In the case of a multiple load instruction, the FIFO read pointer may be reset to its position at the start of the first (interrupted) execution of the instruction.

In the foregoing description of the figures, the invention has been described with reference to specific embodiments thereof. It will, however, be evident that various modifications and changes may be made thereto without departing from the scope of the invention as summarized in the attached claims.

In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

In particular, combinations of specific features of various aspects of the invention may be made. An aspect of the invention may be further advantageously enhanced by adding a feature that was described in relation to another aspect of the invention.

It is to be understood that the invention is limited by the annexed claims and its technical equivalents only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

The invention claimed is:

1. A System-on-Chip (SoC), comprising:
   a processor unit configured to execute a multiple store instruction for storing a plurality of data words;
   a data interface block, DIB, which is external to the processor unit;
   a data bus that connects the processor unit to the DIB; and
   a data interface that is connected to the DIB for transmitting data from the SoC and for receiving data at the SoC;
   wherein the DIB is connected between the data bus and the data interface, the DIB having a first in first out (FIFO) buffer configured to store data from the processor unit to be provided to the data interface for store operations, and configured to, in response to an occurrence of an interrupt during execution of the multiple store instruction, save a state of the multiple store instruction, wherein saving the state of the multiple store instruction comprises storing a value indicating the number of data words corresponding to the multiple store instruction that have already been stored when the interrupt occurs;
   wherein the DIB is further configured to, when the multiple store instruction is executed again by the processor unit after the interrupt, skip storing of a number of data words corresponding to the multiple store instruction, wherein said number of data words that are skipped equals the stored value, such that while executing the multiple store instruction again after the interrupt, data words are not pushed onto the FIFO buffer until the stored value number of data words has been provided by the processor unit to the DIB.

2. The SoC according to claim 1, comprising an interrupt monitoring block, IMB, configured to detect the occurrence of the interrupt and to signal the occurrence to the DIB.

3. The SoC according to claim 2, further comprising an instruction bus, wherein the IMB is connected to the instruction bus for monitoring instructions transmitted on the instruction bus.

4. The SoC according to claim 1, wherein the DIB is configured to detect a start of execution of the multiple store instruction.

5. The SoC according to claim 1, wherein the DIB comprises a data register for storing a data word to be stored, wherein the data register is connected to the data bus.

6. The SoC according to claim 5, wherein the FIFO is connected to the data interface, wherein the data interface is a serial or parallel data interface.

7. The SoC according to claim 5, wherein the FIFO is connected to the data register.

8. The SoC according to claim 1, wherein the processor unit is a designed-in processor unit from a third party processor vendor.

9. The SoC according to claim 8, further comprising an interrupt monitoring block, IMB, external to the processing unit and configured to detect the occurrence of the interrupt and to signal the occurrence of the interrupt to the DIB, and further comprising an instruction bus, wherein the IMB is connected to the instruction bus for monitoring instructions transmitted on the instruction bus.

10. The SoC according to claim 1, further comprising an interrupt monitoring block, IMB, external to the processing unit and configured to detect the occurrence of the interrupt and to signal the occurrence of the interrupt to the DIB, and further comprising an instruction bus, wherein the IMB is connected to the instruction bus for monitoring instructions transmitted on the instruction bus.

11. The SoC according to claim 1, wherein:
the processing unit is configured to execute a multiple load instruction for loading a plurality of data words,
the FIFO is also configured to store data from the data interface to be provided to the processor unit for load operations,
the DIB is further configured to, in response to an occurrence of an interrupt during execution of the multiple load instruction, save a state of the multiple load instruction, wherein saving the state of the multiple load instruction comprises storing a value indicating the number of data words corresponding to the multiple load instruction that have already been loaded when the interrupt occurs, and
the DIB is further configured to, prior to executing the multiple load instruction again after the interrupt, resetting a read pointer of the FIFO buffer to a starting position of the read pointer when the multiple load instruction was first executed prior to the interrupt.

12. A method for storing a plurality of data words in a System-on-Chip (SoC), the method comprising:
executing, in a processor unit of the SOC, a multiple store instruction;
writing at least one data word to a first in first out (FIFO) buffer in a data interface block, DIB, of the SoC in response to executing the multiple store instruction, wherein the DIB is external to the processor unit and connected to the processor unit by a data bus, wherein the at least one data word is written to the FIFO buffer from the processor unit, via the data bus, and then to a data interface in a store operation, wherein the data interface is connected to the DIB for transmitting data from the SoC and for receiving data at the SoC and wherein the DIB is connected between the data bus and the data interface;
detecting an occurrence of an interrupt of the processor unit during execution of the multiple store instruction;
signaling to the DIB that execution of the multiple store instruction is interrupted;
storing, by the DIB, a state of the multiple store instruction, wherein storing the state of the multiple store instruction comprises storing a value indicating the number of data words corresponding to the multiple store instruction that have already been stored when the interrupt occurs; and
when the multiple store instruction is executed again by the processor unit after the interrupt, skipping storing of a number of data words corresponding to the multiple store instruction, wherein said number of data words that are skipped equals the stored value, such that while executing the multiple store instruction again after the interrupt, not pushing data words from the processor unit onto the FIFO buffer until the stored value number of data words has been provided by the processor unit to the DIB.

13. A System-on-Chip (SoC), comprising:
a processor unit configured to execute a multiple store instruction for storing a plurality of data words;
a data interface block, DIB, which is external to the processor unit;
a data bus that connects the processor unit to the DIB; and
a data interface that is connected to the DIB for transmitting data from the SoC;
wherein the DIB is connected between the data bus and the data interface, the DIB having a first in first out (FIFO) buffer in which the DIB is configured to:
push data words from the processing unit to be provided to the data interface for store operations onto the FIFO, in which a word counter is incremented with each pushed data word,
in response to an occurrence of an interrupt during execution of the multiple store instruction, storing a count value of the word counter indicating the number of data words corresponding to the multiple store instruction that have already been stored in the FIFO when the interrupt occurs, and
when the multiple store instruction is executed again by the processor unit after the interrupt, not push data words onto the FIFO until the stored value number of data words received by the DIB from the processing unit.

14. The SoC of claim 13, wherein:
the processor unit configured to also execute a multiple load instruction for loading a plurality of data words;
wherein the DIB is further configured to:
push data words from the data interface to be provided to the processing unit for load operations onto the FIFO, in which the first word counter is incremented with each pushed data word,
in response to an occurrence of an interrupt during execution of the multiple load instruction, resetting a read pointer of the FIFO to a starting position of the read pointer when the multiple load instruction was first executed prior to the interrupt.

15. The SoC according to claim 13, comprising an interrupt monitoring block, IMB, configured to detect the occurrence of the interrupt and to signal the occurrence to the DIB.

16. The SoC according to claim 15, further comprising an instruction bus, wherein the IMB is connected to the instruction bus for monitoring instructions transmitted on the instruction bus.

17. The SoC according to claim 13, wherein the DIB is configured to detect a start of execution of the multiple store instruction.

18. The SoC according to claim 13, wherein the DIB comprises a data register for storing a data word to be stored, wherein the data register is connected to the data bus.

19. The SoC according to claim 18, wherein the FIFO is connected to the data interface, wherein the data interface is a serial or parallel data interface.

20. The SoC according to claim 18, wherein the FIFO is connected to the data register.

* * * * *